United States Patent
Amano et al.

(10) Patent No.: US 7,988,444 B2
(45) Date of Patent: Aug. 2, 2011

(54) MICROLENS TRANSCRIPTION MOLDING ROLLER AND MANUFACTURING METHOD THEREOF

(75) Inventors: Akira Amano, Yokohama (JP); Sumihisa Kondo, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/886,188

(22) Filed: Sep. 20, 2010

(65) Prior Publication Data

US 2011/0007400 A1    Jan. 13, 2011

Related U.S. Application Data

(62) Division of application No. 12/115,743, filed on May 6, 2008, now Pat. No. 7,837,461.

(30) Foreign Application Priority Data

May 7, 2007    (JP) ................. 2007-122701

(51) Int. Cl.
    *B29C 59/04*    (2006.01)
    *B23C 3/04*    (2006.01)
(52) U.S. Cl. ........ 425/471; 264/1.32; 264/1.6; 409/131; 409/219; 425/808
(58) Field of Classification Search .............. 425/363, 425/471, 808; 264/1.32, 1.34, 1.6; 409/131, 409/219

See application file for complete search history.

(56) References Cited

U.S. PATENT DOCUMENTS

| 3,874,836 A | 4/1975 | Johnson et al. |
| 4,615,090 A | 10/1986 | Baus |
| 5,324,188 A | 6/1994 | Santoh et al. |
| 5,644,431 A | 7/1997 | Magee |
| 6,491,481 B1 | 12/2002 | Border et al. |
| 7,645,134 B2 | 1/2010 | Jackson et al. |

FOREIGN PATENT DOCUMENTS

| JP | 11-216761 | 8/1999 |
| JP | 2001-030273 | 2/2001 |
| JP | 2002-144348 A | 5/2002 |
| JP | 2002-192540 | 7/2002 |
| JP | 2003-80598 | 3/2003 |

OTHER PUBLICATIONS

"Ultra Precise Cutting of Die for Micro Lens Array Using Diamond Cutting Tool (3)-Micro Patterning of High Accuracy of Lens Array for Roll Die-", Mar. 1, 2007.
Partial English translation of Article: "Ultra Precise Cutting of Die for Micro Lens Array Using Diamond Cutting Tool (3)-Micro Patterning of High Accuracy of Lens Array for Roll Die-".
English Abstract of JP-2002-144348A published May 21, 2002.
English Specification of JP-2002-144348A published May 21, 2002.
Korean Office Action issued in KR Appl 10-2008-0041703 on Jul. 24, 2009.
English Language Abstract of JP 2003-080598 published Mar. 19, 2003.
English Language Abstract of JP 2002-192540 published Jul. 10, 2002.

(Continued)

*Primary Examiner* — James Mackey
(74) *Attorney, Agent, or Firm* — DLA Piper LLP US

(57) ABSTRACT

A microlens transcription molding roller used for transcription-molding a plurality of microlenses on a sheet includes a plurality of microlens molding surfaces arrayed on an outer circumference of the roller along one spiral around an axis of the roller at a constant interval.

3 Claims, 7 Drawing Sheets

OTHER PUBLICATIONS

English machine translation of JP 2003-080598 published Mar. 19, 2003.
English machine translation of JP 2002-192540 published Jul. 10, 2002.
Korean Office Action issued in KR Appl 10-2008-0041703 on Oct. 7, 2009.
English Language Abstract of JP 2001-030273 published Feb. 6, 2001.
English machine translation of JP 2001-030273 published Feb. 6, 2001.
Office Action issued in corresponding CN 200810099410.0 on Dec. 18, 2009.
English Translation of Office Action (Bibliographical portion only) issued in corresponding CN 200810099410.0 on Dec. 18, 2009.
English Language Abstract of JP 11-216761 published on Aug. 10, 1999.
English Machine Translation of JP 11-216761 published on Aug. 10, 1999.
Office Action issued in U.S. Appl. No. 12/115,743 on Apr. 7, 2010.
Image File Wrapper of U.S. Appl. No. 12/115,743 as of Sep. 20, 2010.

MICROLENS TRANSCRIPTION MOLDING ROLLER AND MANUFACTURING METHOD THEREOF

This application is a divisional of U.S. application Ser. No. 12/115,743 filed May 6, 2008, now U.S. Pat. No. 7,837,461 issued on Nov. 23, 2010. U.S. application Ser. No. 12/115,743, now U.S. Pat. No. 7,837,461, claims priority to Japanese Patent Application No. 2007-122701 filed May 7, 2007. The entire contents of all of the applications mentioned above are incorporated herein by reference.

BACKGROUND OF THE INVENTION

1. Field of the Invention

The present invention relates to a microlens transcription molding roller provided with a microlens molding surface On an outer circumference thereof, a manufacturing method and apparatus of the microlens transcription molding roller and a microlens optical sheet.

2. Description of Related Art

A microlens array has been used in a field of light-controlling by concentration, diffusion, reflection, diffraction and the like, e.g. in the field of liquid crystal display, light-coupling device and image input device.

The microlens array is a device provided with minute concave or convex sheet-arranged unit lenses having diameter of approximately 10-300 μm and depth of approximately 0.6-60 μm. The respective lenses are normally designed on a spherical surface or an aspheric surface in a manner axisymmetric with the center thereof.

In order to manufacture a transcription-molding roller of such a microlens array, a drilling method disclosed in Document 1 (JP-2002-144348A) has been conventionally known.

In the drilling method, a base is disposed in a manner three-dimensionally movable relative to a diamond tool rotated by a rotary drive. Initially, the base is moved toward the diamond tool to form one microlens molding cavity. Then, the base is moved away from the diamond tool in a constant direction to determine the next position of the tool. Subsequently, the base is moved toward the diamond tool to form the next microlens molding cavity. The above steps are repeated to provide a plurality of microlens molding cavities on the surface of the base.

Another known method is a roller-cutting processing method disclosed in Document 2 ("Ultra Precise Cutting of Die for Micro Lens Array using Diamond Cutting Tool (3)—Micro Patterning of High Accuracy Lens Array for Roll Die—" in Papers of Tutorial Lectures in 2007 Spring Semestrial Meeting of Japan Society for Precision Engineering: published in Mar. 1, 2007).

In the roller-cutting processing method, a roller is rotated around a roller shaft and an arc-tip diamond tool is moved toward and away from the roller at a high speed to sequentially form concave lens molding surfaces on the outer circumference of the roller. After the processing for one rotation of the roller is completed, the diamond tool is axially moved along the roller (normally by an interval for one lens) to be positioned, where the above operation is repeated to provide the lens molding surfaces on the outer circumference of the roller.

The drilling method disclosed in the Document 1 requires around one second for forming one lens molding surface. Accordingly, a great long time would be required for densely providing several tens-micron-size pattern on the entirety of a microlens pattern optical sheet.

On the other hand, in the roller-cutting processing method disclosed in the Document 2, the alignment accuracy of the lens pattern is influenced by a controlling process of the position for machining the lens pattern. In the method disclosed in the Document 2, the rotating position of the roller is recognized by an external position sensor and the diamond tool is advanced and retracted being triggered by a signal from the position sensor. Accordingly, the timing for advancing and retracting the diamond tool may vary in accordance with the sensitivity of the position sensor and transmission speed error of the trigger signal, which consequently results in deviation of processing position of the lens pattern.

Further, in the above method, after finishing the lens pattern processing for one rotation of the roller, the advancement and retraction of the diamond tool is stopped once, and, simultaneously, the diamond tool is moved axially along the roller by the length of one lens, where the lens-pattern machining for one rotation of the roller is conducted in response to the signal from the position sensor. Since the roller-cutting processing method requires repetition of the sequence of the operations, when the lens-patterning is conducted all over the roller, the processing is suspended while the lens-patterning is stopped and the diamond tool is moved, which results in deterioration of operation efficiency.

SUMMARY OF THE INVENTION

An object of the present invention is to provide a microlens transcription molding roller that can solve the above problem and can efficiently provide a highly accurate microlens pattern with a simple arrangement, a manufacturing method and a manufacturing apparatus of the microlens transcription molding roller and a microlens optical sheet.

A microlens transcription molding roller according to an aspect of an aspect of the present invention used for transcription-molding a plurality of microlenses on a sheet includes a plurality of microlens molding surfaces arrayed on an outer circumference of the roller along one spiral around an axis of the roller at a constant interval.

According to the above aspect, since the plurality of microlens molding surfaces are arranged on the outer circumference of the roller at the constant interval along the one spiral around the axis of the roller, all of the microlens molding surfaces can be continuously machined along the one spiral by controlling the movement of the tool and the rotary operation of the roller so that the locus of the tool depicts one spiral along the outer circumference of the roller. Accordingly, highly accurate microlens pattern can be efficiently formed with a simple arrangement.

A manufacturing method for manufacturing the microlens transcription molding roller according to another aspect of the present invention includes: a roller rotating step for rotating a roller material around an axis of the roller material; a tool moving step for moving a tool having an arc blade tip end in the axial direction of the roller material; and a tool advancing/retracting step for retracting and advancing the tool relative to the roller material at a constant cycle, in which a plurality of microlens molding surfaces are provided on an outer circumference of the roller material at a constant interval along one spiral around an axis of the roller material while controlling the roller rotating step, the tool moving step and the tool advancing/retracting step.

Accordingly, by synchronously controlling the roller rotating step, the tool moving step and the tool advancing/retracting step, the plurality of microlens molding surfaces can be continuously machined at a constant pitch on the outer circumference of the roller material along the one spiral around the axis of the roller material.

Accordingly, a position sensor and a trigger transmitting mechanism are not required unlike the roller-cutting processing method mentioned in the Background Art section, so that deviation in the machining position of a lens pattern on account of sensitivity of position sensor and error in trigger transmission speed is not caused. Accordingly, highly accurate lens pattern machining is possible. In addition, it is not necessary to suspend the lens pattern machining to move the tool, the machining time can be reduced.

In the manufacturing method of the microlens transcription molding roller according to the above aspect of the invention, it is preferable that the roller rotating step, the tool moving step and the tool advancing/retracting step are controlled so that the spiral is shifted per two rotations of the spiral by a substantial outer diameter of the microlens molding surface multiplied by square root of two in the axial direction of the roller material, and the tool advancing/retracting step is controlled so that the interval between the microlens molding surfaces adjoining in the axial direction of the roller material becomes substantially equal to the outer diameter of the microlens molding surface multiplied by square root of two.

According to the above arrangement, the microlens molding surfaces are continuously machined along a locus in which the spiral is shifted per two rotations of the spiral by the substantial outer diameter of the microlens molding surface multiplied by square root of two in the axial direction of the roller material. Further, the interval between the microlens molding surfaces adjoining in the axial direction of the transcription molding roller unit becomes substantially equal to the outer diameter of the microlens molding surface multiplied by square root of two. Accordingly, the plurality of microlens molding surfaces can be regularly and densely provided on the outer circumference of the roller material, which results in improvement in the optical performance of the optical sheet fabricated by transcription molding using the roller.

In the manufacturing method of the microlens transcription molding roller according to the above aspect of the invention, it is preferable that the roller rotating step, the tool moving step and the tool advancing/retracting step are controlled so that the spiral is shifted per two rotations of the spiral by a substantial outer diameter of the microlens molding surface in the axial direction of the roller material, and the tool advancing/retracting step is controlled so that the interval between the microlens molding surfaces adjoining in the axial direction of the roller material becomes substantially equal to the outer diameter of the microlens molding surface.

According to the above arrangement, the microlens molding surfaces are continuously machined along a locus in which the spiral is shifted by the substantial outer diameter of the microlens molding surface in the axial direction of the roller material per two rotations of the spiral. Further, the interval between the microlens molding surfaces adjoining in the axial direction of the roller material becomes equal to the substantial outer diameter of the microlens molding surface. Accordingly, the density of the microlens molding surfaces provided on the outer circumference of the roller material can be enhanced, which results in further improvement of the optical performance of the optical sheet fabricated by transcription molding using the roller.

In the manufacturing method of the microlens transcription molding roller of the above aspect of the invention, it is preferable that the outer circumference of the roller material is machined so that unmachined portion remains between the microlens molding surfaces adjoining in the spiral direction and in the axial direction of the roller material.

According to the above arrangement, since the unmachined outer circumference of the roller material remains between the microlens molding surfaces adjoining in spiral direction and in the axial direction of the roller, the configuration accuracy and array regularity of the microlens molding surface can be checked by measuring the width of the portion and the like. Accordingly, the manufactured microlens transcription molding roller can be easily checked.

A manufacturing apparatus for manufacturing the microlens transcription molding roller according to still another aspect of the present invention includes: a roller rotating unit that rotates a roller material around an axis of the roller material; a tool moving unit that moves a tool having an arc blade tip end in the axial direction of the roller material; a tool advancing/retracting unit that retracts and advances the tool relative to the roller material at a constant cycle; and a controller that forms a plurality of microlens molding surfaces on an outer circumference of the roller material at a constant interval along one spiral around an axis of the roller material while controlling the roller rotating unit, the tool moving unit and the tool advancing/retracting unit.

According to the above aspect, a machine tool such as a lathe can be used for machining the roller material. When a lathe is used to machine the roller material, by rotating the roller material around the axis of the roller material by a spindle head and moving a tool attached to a bite holder toward and away from the roller material at a constant cycle while moving the tool in the axial direction of the roller material, the plurality of microlens molding surfaces can be formed on the outer circumference of the roller material along the one spiral around the axis of the roller material at a constant interval, so that the microlens molding surface pattern can be continuously and efficiently formed with a simple structure. Accordingly, the manufacturing apparatus of a microlens transcription molding roller can be advantageously provided using a simple device and machinery.

A microlens optical sheet according further aspect of the invention is transcription-molded by the microlens transcription molding roller according to the above aspect.

According to the above arrangement, since the plurality of microlens molding surfaces are transcripted using the microlens transcription molding roller having an array of the molding surfaces along one spiral on the outer circumference of the roller, i.e. since the microlens molding surfaces are regularly arrayed and densely provided, excellent optical performance can be provided on the microlens optical sheet.

DETAILED DESCRIPTION OF PREFERRED EMBODIMENT(S)

Figure 1A:
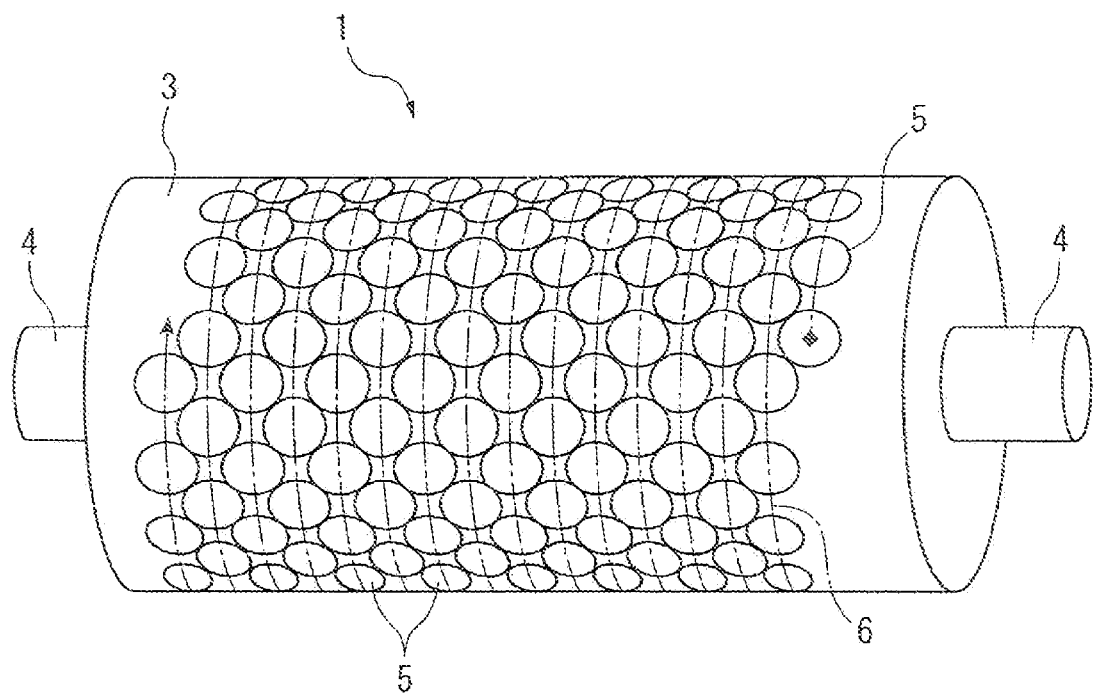
FIG. 1A is an illustration showing a first embodiment of a microlens transcription molding roller of the present invention.

Embodiment(s) of the present invention will be described below with reference to attached drawings.
Microlens Transcription Molding Roller: See FIG. 1A-FIG. 2B As shown in FIGS. 1A to FIG. 2B, the microlens transcription molding rollers 1, 2 include a transcription molding roller unit 3 and a support shaft 4 provided on both axial ends of the transcription molding roller unit 3. A plurality of microlens molding surfaces 5 are arranged on the outer circumference of the transcription molding roller unit 3 at a constant interval along one spiral 6 around the axis of the transcription molding roller unit 3. Each of the microlens molding surfaces 5 of the rollers 1, 2 is formed in an approximately circular concave sphere with approximately 10-300 μm outer diameter and 0.6-50 μm depth.

Since the plurality of microlens molding surfaces 5 of the microlens transcription molding rollers 1, 2 are arranged on the outer circumference of the transcription molding roller unit 3 at the constant interval along the one spiral 6 around the axis of the transcription molding roller unit 3, when, for instance, the rollers are machined by a tool, all of the microlens molding surfaces 5 can be continuously machined along the one spiral 6 by controlling the movement of the tool in the roller axial direction and the rotary speed of the microlens transcription molding rollers 1, 2 so that the locus of the tool depicts one spiral along the outer circumference of the transcription molding roller unit 3. Accordingly, the microlens pattern can be efficiently formed with a simple arrangement.

Figure 1B:
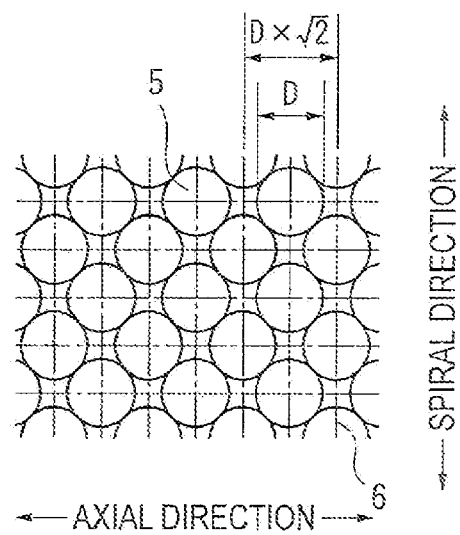
FIG. 1B is another illustration showing the first embodiment of the microlens transcription molding roller of the present invention.

In the microlens transcription molding roller 1 shown in. FIGS. 1A and 1B, the spiral 6 is shifted in the axial direction of the transcription molding roller unit 3 by D (substantial outer diameter of the microlens molding surface 5 of the transcription molding roller unit 3)*v2 per two rotations of the spiral along the outer circumference of the transcription molding roller unit 3, and the interval between the microlens molding surfaces 5 adjoining in the axial direction of the transcription molding roller unit 3 is equal to D*v2. In other words, the adjoining microlens molding surfaces 5 are arrayed with a predetermined gap in the direction of the spiral 6 and in the axial direction of the transcription molding roller unit 3, and the gap is substantially equal to D (substantial outer diameter of the microlens molding surface 5 of the transcription molding roller unit 3)*(v2−1).

According to the above arrangement, the microlens molding surfaces 5 are continuously machined along a locus in which the spiral 6 is shifted by D*v2 in the axial direction of the transcription molding roller unit 3 per two rotations of the spiral. Further, the interval between the microlens molding surfaces 5 adjoining in the axial direction of the transcription molding roller unit 3 becomes equal to D*v2. Accordingly, the plurality of microlens molding surfaces 5 can be regularly and densely provided on the outer circumference of the transcription molding roller unit 3, which results in improvement in the optical performance of the optical sheet fabricated by transcription molding using the roller.

Figure 2A:
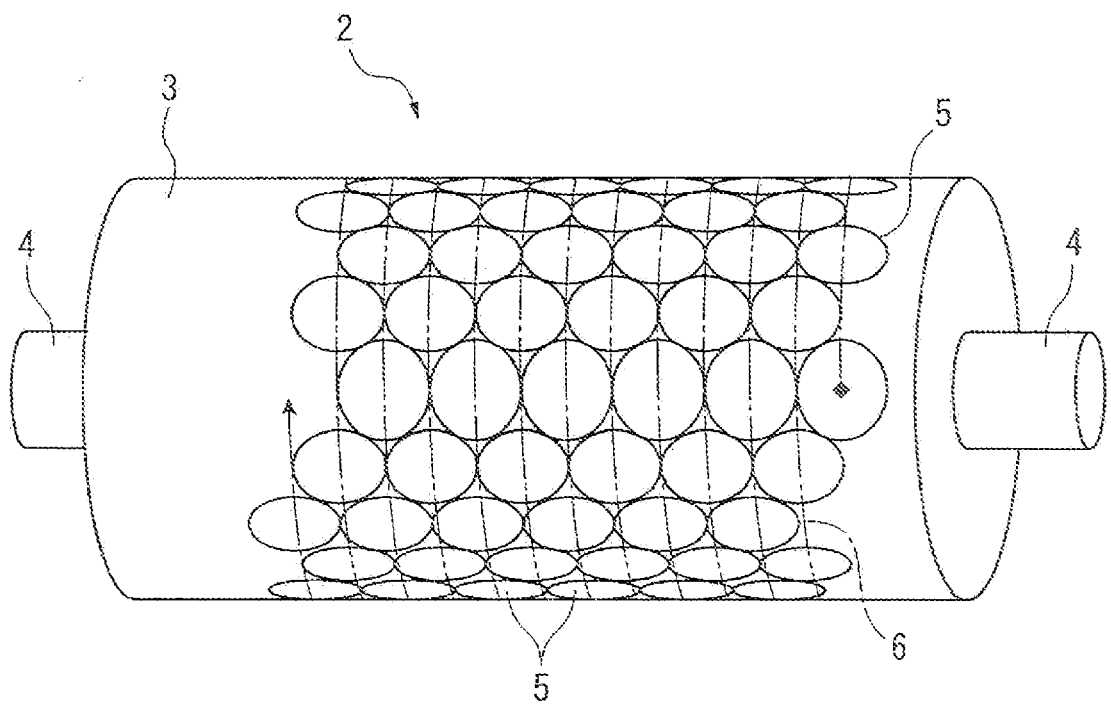
FIG. 2A is an illustration showing a second embodiment of a microlens transcription molding roller of the present invention.
Figure 2B:
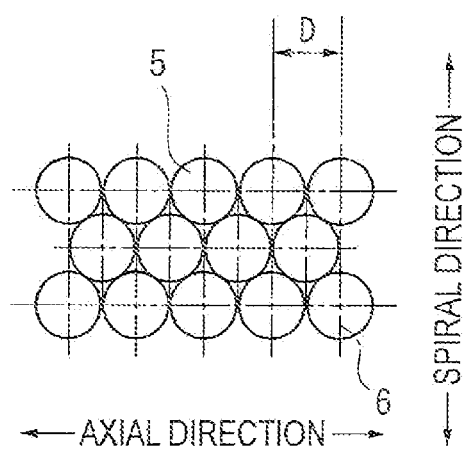
FIG. 2B is another illustration showing the second embodiment of the microlens transcription molding roller of the present invention.

In the microlens transcription molding roller 2 shown in FIGS. 2A and 2B, the spiral 6 is shifted in the axial direction of the transcription molding roller unit 3 by D (substantial outer diameter of the microlens molding surface 5 of the transcription molding roller unit 3) per two rotations of the spiral along the outer circumference of the transcription molding roller unit 3, and the interval between the microlens molding surfaces 5 adjoining in the axial direction of the transcription molding roller unit 3 is equal to the substantial outer diameter of the transcription molding roller unit 3. Specifically, the microlens molding surfaces 5 adjoining in the direction of the spiral 6 is spaced apart with a predetermined gap (a gap substantially equal to D [the substantial outer diameter of the microlens molding surface 5]*0.4) and the microlens molding surfaces 5 adjoining in the axial direction of the transcription molding roller unit 3 are in contact with each other.

According to the above arrangement, the microlens molding surface 5 is continuously machined along a locus in which the spiral 6 is shifted by D in the axial direction of the transcription molding roller unit 3 per two rotations of the spiral. Further, the interval between the microlens molding surfaces adjoining in the axial direction of the transcription molding roller unit 3 becomes equal to D. Accordingly, the density of the microlens molding surfaces 5 provided on the outer circumference of the transcription molding roller unit 3 can be enhanced, which results in further improvement of the optical performance of the optical sheet produced by transcription molding using the roller.
Manufacturing Apparatus: See FIGS. 3-4

Figure 3:
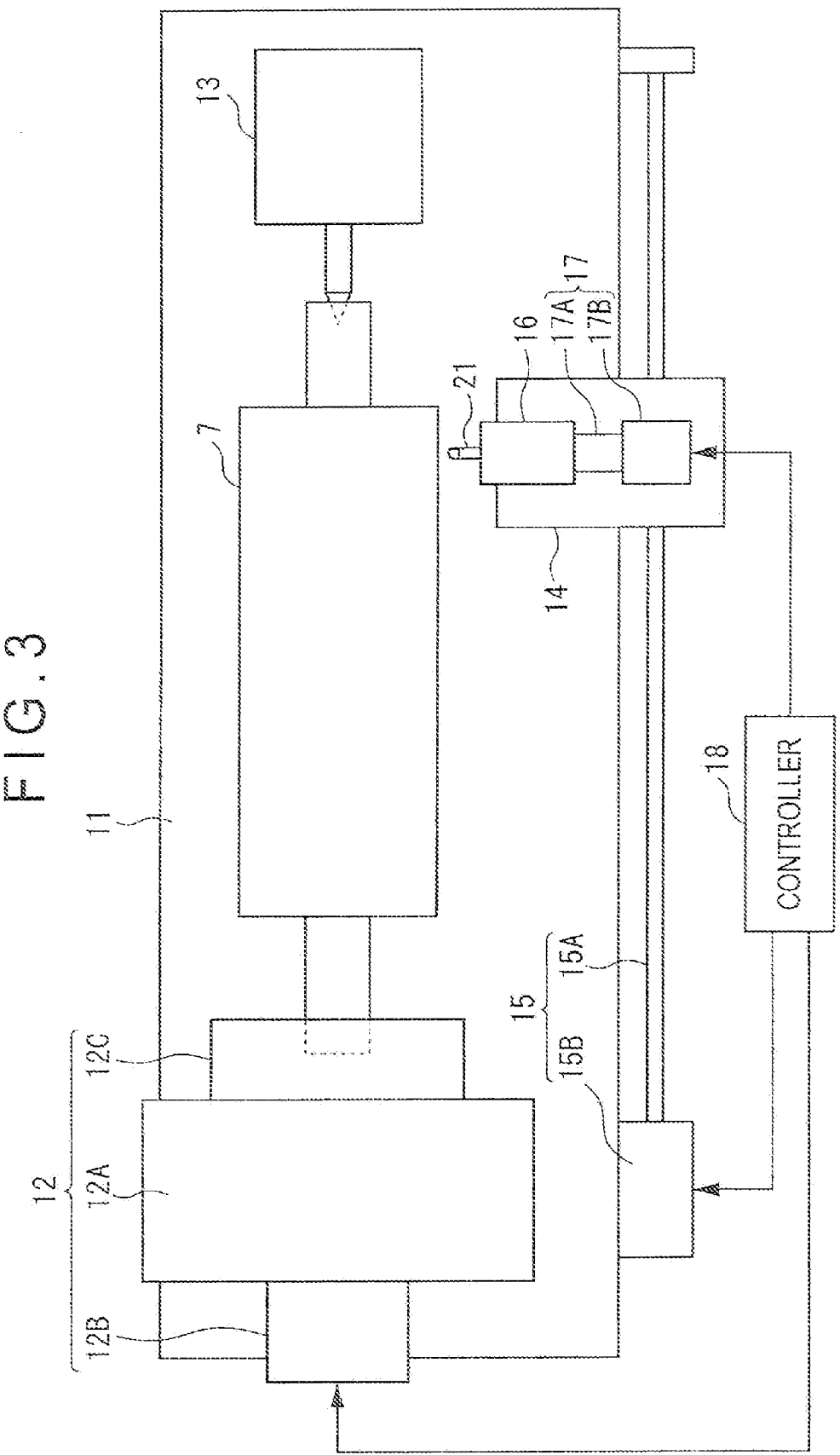
FIG. 3 is a plan view showing an embodiment of a manufacturing apparatus of the present invention.

As shown in FIG. 3, the manufacturing apparatus of a microlens transcription molding roller according to the embodiment includes: a bed 11; a spindle head 12 provided on the bed 11 to rotate a roller material 7 (i.e. a roller material 7 having the transcription molding roller unit 3 and the support shaft 4) around the axis of the roller material 7; a core pressing unit 13 provided on the bed 11 to be spaced apart from the spindle head 12; a reciprocating table 14 provided on the bed 11 in a manner capable of reciprocating movement; a reciprocating mechanism 15 for reciprocating the reciprocating table 14 in the axial direction of the roller material 7; a bite holder 16 provided with a tool 21 and provided on the reciprocating table 14 in a manner advanceable and retractable in a direction orthogonal to the axis of the roller material 7; an advancing/retracting mechanism for advancing and retracting the bite holder 16 toward and away from the roller material 7 at a constant cycle; and a controller 18 for controlling the operation of the spindle head 12, the reciprocating mechanism 15 and the advancing/retracting mechanism 17.

The spindle head 12 includes a spindle head body 12A, a motor 12B provided on the spindle head body 12A, and a chuck mechanism connected with an output shaft of the motor 12B. When the motor 12B is rotated while one of the support shafts 4 of the roller material 7 is chucked by the chuck mechanism 12C and the other of the support shafts is rotatably supported by the core pressing unit 13, the roller material 7 is rotated around the axis of the roller material 7 in accordance with the rotation of the motor 12B. The spindle head 12 and the core pressing unit 13 provide a roller rotating unit for rotating the roller material 7 around the axis thereof.

The reciprocating mechanism 15 includes a lead screw shaft 15A screwed with the reciprocating table 14 and rotatably supported along the bed 11, and a motor 15B for rotating the lead screw shaft 15A. The reciprocating table 14 and the reciprocating mechanism 15 provide a tool moving unit for moving the tool 21 in the axial direction of the roller material 7.

The advancing/retracting mechanism 17 includes a connecting shaft 17A connected with the bite holder 16 and a high-speed reciprocating vibrating mechanism. 17B connected with the connecting shaft 17A. The high-speed reciprocating vibrating mechanism 17B is made of a laminated body of piezoelectric elements in which a plurality of piezoelectric elements are laminated. The bite holder 16 and the advancing/retracting mechanism 17 provide a tool advancing/retracting unit for advancing and retracting the tool 21 relative to the roller material 7 at a constant cycle.

Figure 4:
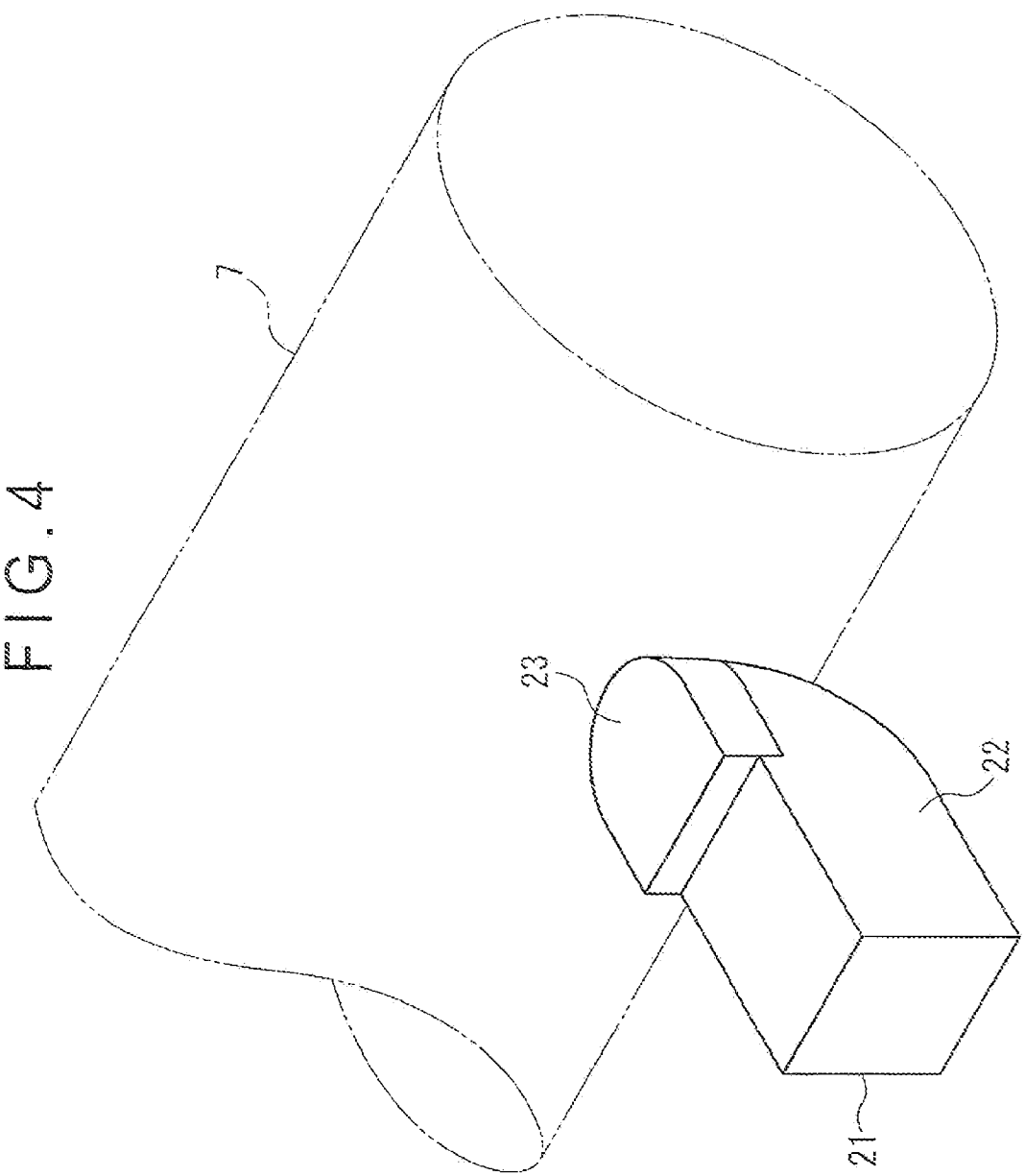
FIG. 4 is a perspective view showing a tool used in the above embodiment.

As shown in FIG. 4, the tool 21 includes a tool body 22 fixed on the bite holder 16 and a diamond blade tip 23 attached on a tip end of the tool body 22. The tip end of the blade tip 23 is formed in an arc.

Manufacturing Method of Microlens Transcription Molding Roller: See FIG. 3-FIG. 5C In order to manufacture the microlens transcription molding rollers 1, 2, the roller material 7 is rotated around the axis thereof (roller-rotating step) and, in this state, while the tool 21 having the arc tip end is moved in the axial direction of the roller material 7 (tool-moving step), the tool 21 is advanced and retracted relative to the roller material 7 at a constant cycle (tool advancing/retracting step).

Figure 5A:
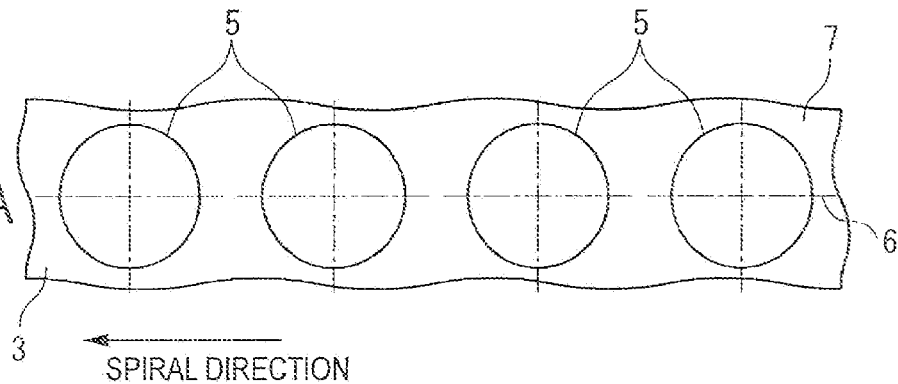
FIG. 5A is a plan view showing a manufacturing process of the above embodiment.
Figure 5B:
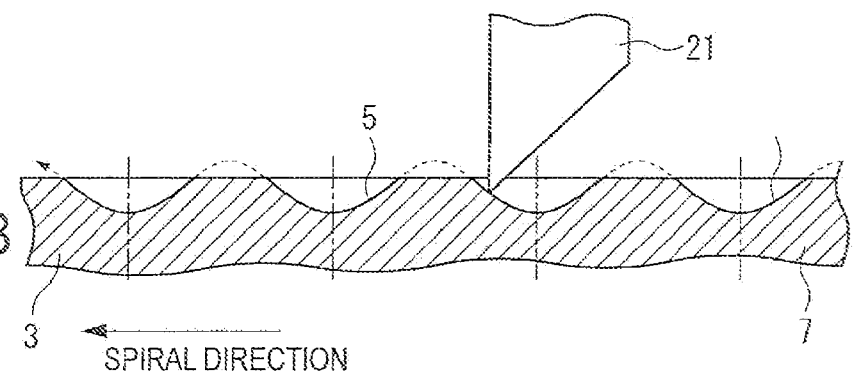
FIG. 5B is a side view showing the manufacturing process of the above embodiment.

When the tool 21 is advanced and retracted relative to the roller material 7, circular and concavely recessed microlens molding surfaces 5 are formed on the outer circumference of the roller material 7 by a constant interval along the spiral 6 during one rotation of the roller material 7, as shown in FIGS. 5A and 5B.

Figure 5C:
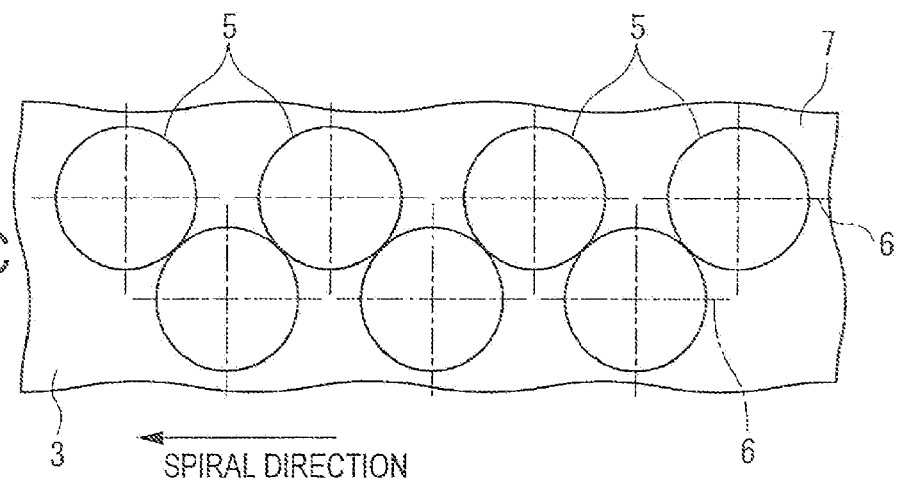
FIG. 5C is a plan view showing the manufacturing process of the above embodiment.

When the roller material 7 finishes the first rotation and enters into the second rotation, the microlens molding surfaces 5 are formed at positions in contact with the previously formed (i.e. during the first rotation) microlens molding surfaces 5 as shown in FIG. 5C.

At this time, when the tool 21 is advanced and retracted relative to the transcription molding roller unit 3 at a constant cycle by a constant pitch along a locus in which the spiral 6 is shifted in the axial direction of the transcription molding roller unit 3 by D (substantial outer diameter of the microlens molding surface 5 of the transcription molding roller unit 3)*v2 per two rotations of the spiral along the outer circumference of the transcription molding roller unit 3, the microlens transcription molding roller 1 shown in FIGS. 1A and 1B can be obtained. In other words, a microlens molding surface pattern can be obtained, in which an interval between the microlens molding surfaces 5 adjoining in the axial direction of the transcription molding roller unit 3 is equal to D (substantial outer diameter of the microlens molding surface 5 of the transcription molding roller unit 3)*v2.

Alternatively, when the tool 21 is advanced and retracted relative to the transcription molding roller unit 3 at a constant cycle by a constant pitch along a locus in which the spiral 6 is shifted in the axial direction of the transcription molding roller unit 3 by D (substantial outer diameter of the microlens molding surface 5 of the transcription molding roller unit 3) per two rotations of the spiral along the outer circumference of the transcription molding roller unit 3, the microlens transcription molding roller 2 shown in FIGS. 2A and 2B can be obtained. In other words, a microlens molding surface pattern can be obtained, in which an interval between the microlens molding surfaces 5 adjoining in the axial direction of the transcription molding roller unit 3 is equal to D (substantial outer diameter of the microlens molding surface 5 of the transcription molding roller unit 3).

According to the manufacturing apparatus and method as discussed above, a position sensor and a trigger transmitting mechanism are not required unlike the roller-cutting processing method mentioned in the Background Art section, so that deviation in the machining position of a lens pattern on account of sensitivity of position sensor and error in trigger transmission speed is not caused. Accordingly, highly accurate lens pattern machining is possible. In addition, it is not necessary to suspend the lens pattern machining to move the tool, the machining time can be reduced.

Further, a machine tool such as a lathe can be used for machining the lens pattern. Specifically, as shown in FIG. 3, by rotating the roller material 7 around the axis of the roller material 7 by the spindle head 12 and the core pressing unit 13 and moving the tool 21 attached to the bite holder 16 toward and away from the roller material 7 at a constant cycle while moving the tool 21 in the axial direction of the roller material 7, the plurality of microlens molding surfaces 5 can be formed on the outer circumference of the roller material 7 along the one spiral around the axis of the roller material 7 at a constant interval, so that the microlens molding surface pattern can be continuously and efficiently formed with a simple structure. Accordingly, the manufacturing apparatus of a microlens transcription molding roller can be advantageously provided using a simple device and machinery.

Microlens Optical Sheet: See FIG. 6

Figure 6:
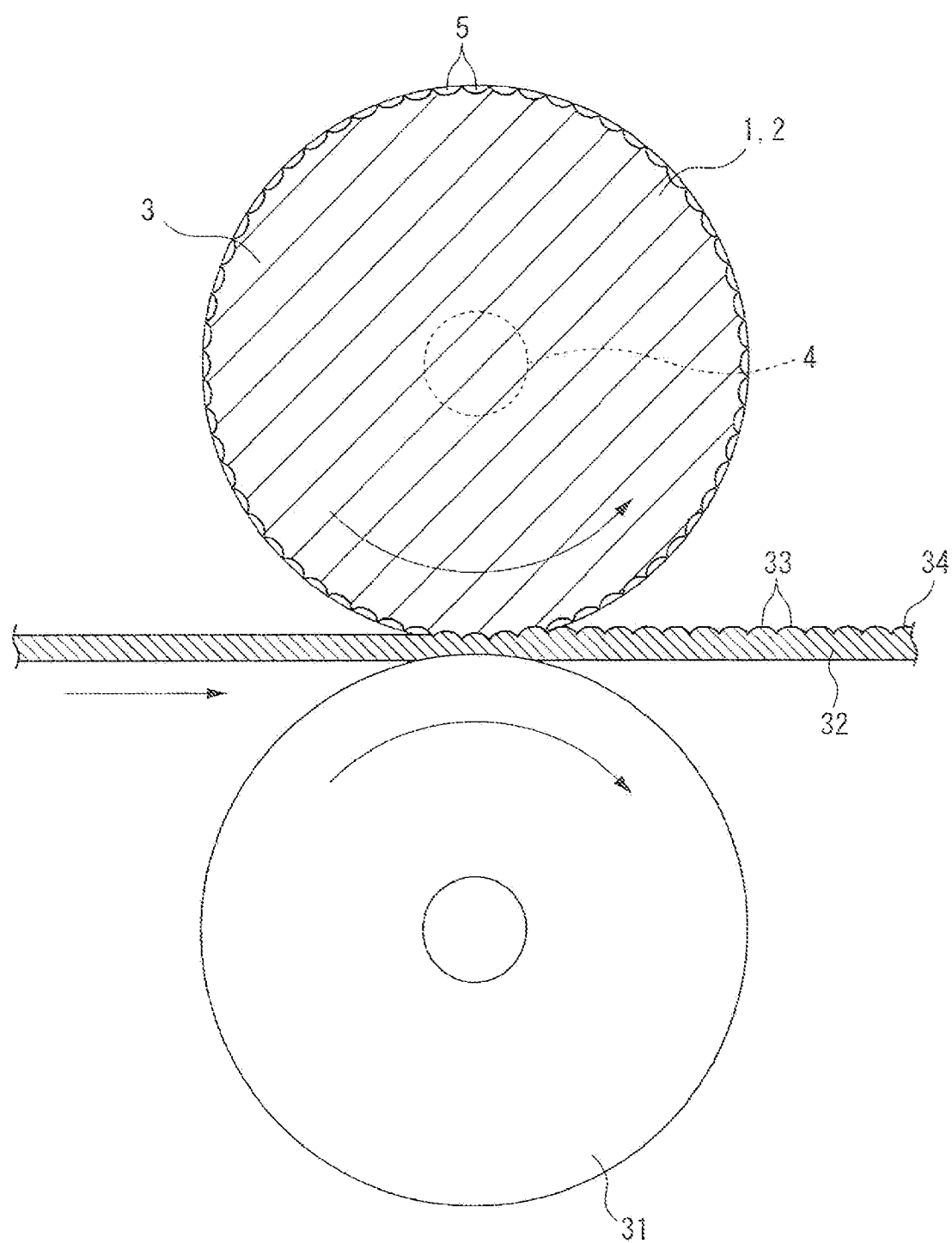
FIG. 6 is an illustration showing a manufacturing method of a microlens optical sheet of the present invention.

As shown in FIG. 6, the microlens transcription molding roller 1, 2 and a press roller 31 are disposed in a face-to-face manner, and a molding sheet 32 is extruded from the nip between the roller 1, 2 and the press roller 31. At this time, the roller 1, 2 and the press roller 31 and/or the molding sheet 32 are heated for facilitating the shaping process of the molding sheet.

Then, the microlens molding surfaces 5 provided on the outer circumference of the microlens transcription molding roller 1, 2 is transcripted onto the surface of the extruded molding sheet 32. In other words, a microlens optical sheet 34 provided with a plurality of convex microlenses 33 can be obtained.

According to thus manufactured microlens optical sheet 34, since the plurality of microlens molding surfaces 5 are transcripted using the microlens transcription molding roller 1, 2 having an array of the molding surfaces along one spiral on the outer circumference of the roller, i.e. since the microlens molding surfaces 5 are regularly arrayed and densely provided, excellent optical performance can be provided on the microlens optical sheet 34.

Modifications

The scope of the present invention is not limited to the above exemplary embodiments, but includes modifications and improvements as long as an object of the present invention can be achieved.

Though the microlens molding surfaces 5 adjoining in spiral direction and in the axial direction of the roller material 7 are formed in contact with each other, other arrangement is possible.

Figure 7:
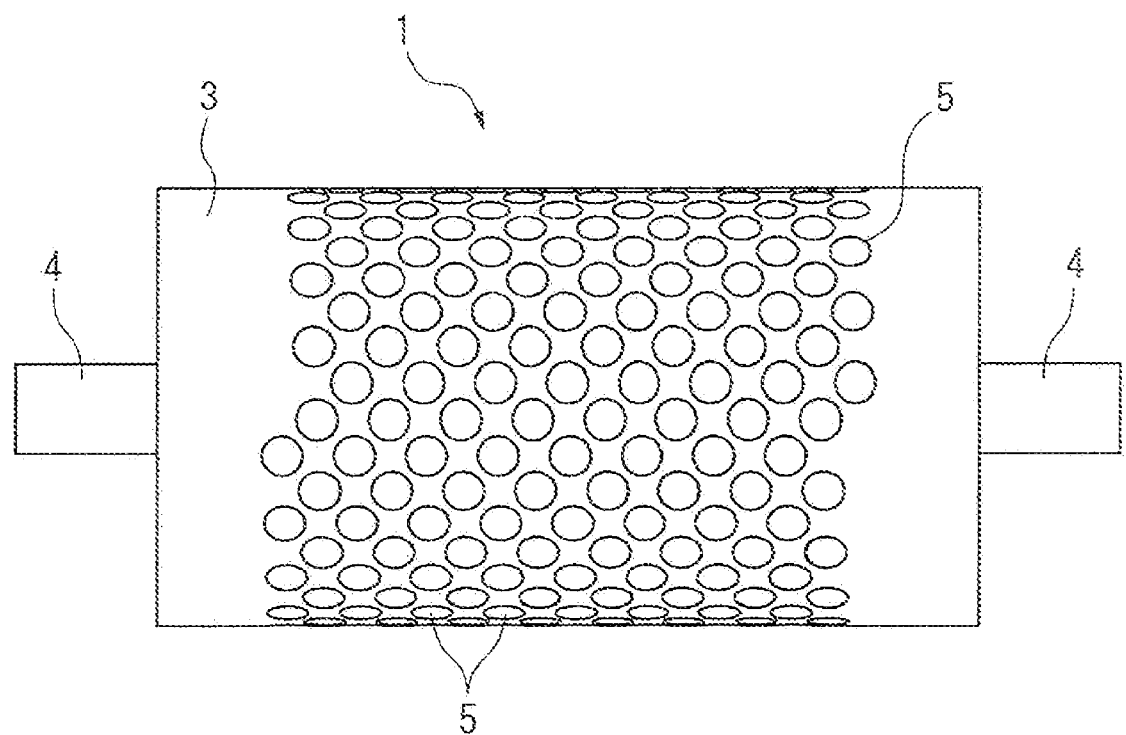
FIG. 7 is an illustration showing a modification of a microlens transcription molding roller of the present invention.

For instance, as shown in FIG. 7, the outer circumference of the roller material 7 may be machined so that unmachined portion remains between the microlens molding surfaces 5 adjoining in spiral direction and in the axial direction of the roller.

According to the above arrangement, since the unmachined outer circumference portion of the roller material 7 remains between the microlens molding surfaces 5 adjoining in spiral direction and in the axial direction of the roller, the configuration accuracy and array regularity of the microlens molding surface 5 can be checked by measuring the width of the portion and the like. Accordingly, the manufactured microlens transcription molding roller can be easily checked.

The priority application Number JP 2007-122701 upon which this patent application is based is hereby incorporated by reference.

The invention claimed is:

1. A microlens transcription molding roller used for transcription-molding a plurality of microlenses on a sheet, comprising:
   a plurality of microlens molding surfaces provided on the outer circumference of the roller, the plurality of microlens molding surfaces being arrayed at a constant interval along one spiral around an axis of the roller, wherein
   the spiral is shifted per two rotations of the spiral by an outer diameter of the microlens molding surface in an axial direction of the roller, and
   the interval between the microlens molding surfaces adjoining in the axial direction of the roller becomes substantially equal to the outer diameter of the microlens molding surface.

2. A manufacturing method for manufacturing the microlens transcription molding roller according to claim 1, comprising:
   rotating a roller material around an axis of the roller material;
   moving a tool having an arc blade tip end in the axial direction of the roller material; and
   retracting and advancing the tool relative to the roller material at a constant cycle, wherein
   a plurality of microlens molding surfaces are provided on an outer circumference of the roller material at a constant interval along one spiral around an axis of the roller material while the rotating, the tool moving step and the tool advancing/retracting,
   wherein
   the rotating, the moving and the advancing/retracting are controlled so that the spiral is shifted per two rotations of the spiral by an outer diameter of the microlens molding surface in the axial direction of the roller material, and
   the advancing/retracting is controlled so that the interval between the microlens molding surfaces adjoining in the axial direction of the roller material becomes substantially equal to the outer diameter of the microlens molding surface.

3. The manufacturing method for manufacturing the microlens transcription molding roller according to claim 2, wherein
   the outer circumference of the roller material is machined so that unmachined portion remains between the microlens molding surfaces adjoining in the spiral direction and in the axial direction of the roller material.

* * * * *